Nov. 14, 1950  J. H. JOST  2,530,333
APPARATUS FOR REPAIRING RADIATORS
Filed Oct. 25, 1946  2 Sheets-Sheet 1

INVENTOR
JOHN H. JOST
By Paul, Paul & Moore
ATTORNEYS

Nov. 14, 1950     J. H. JOST     2,530,333
APPARATUS FOR REPAIRING RADIATORS

Filed Oct. 25, 1946     2 Sheets-Sheet 2

INVENTOR
JOHN H. JOST
By Paul, Paul & Moore
ATTORNEYS

Patented Nov. 14, 1950

2,530,333

UNITED STATES PATENT OFFICE 2,530,333

APPARATUS FOR REPAIRING RADIATORS

John H. Jost, Little Falls, Minn.

Application October 25, 1946, Serial No. 705,561

8 Claims. (Cl. 73—51)

This invention relates to new and useful improvements in apparatus for repairing radiators such as are commonly used in connection with automobile, truck, and tractor engines and other such apparatus, whereby the operation of making repairs to such radiators may be greatly expedited.

Radiators such as are now commonly used in the cooling systems of automobile, truck, and tractor engines, occasionally become leaky and must be repaired. This may involve much soldering, depending upon the nature of the leaks, and it may also require considerable handling of the radiator to place it in the best possible position whereby the molten solder may be assisted by gravity as much as possible in the operation of accurately localizing it over the defective or leaky portion of the radiator. After the portions of the radiator found to be leaky have been soldered, it is usually customary to introduce air under pressure into the radiator core and then submerge the radiator in water to determine if all leaks have been repaired, and, if not, where other leaks may be localized. This, as above stated, may require considerable handling of the radiator, particularly when the radiator may have to be soldered several times before all leaks have been repaired.

By the use of the novel apparatus herein disclosed, the operation of locating leaks and repairing them may be greatly expedited, in that once the radiator has been properly positioned in the apparatus, all repairs may be made thereon and the radiator tested in a tank of water without detaching the tank from the supporting means of the apparatus.

An important object of the invention, therefore, is to provide a simple and inexpensive apparatus for supporting the radiator of an internal combustion engine cooling system, when it becomes necessary to make repairs thereto, whereby access may be had to all sides of the radiator without removing it from said support, adapted for universal movement whereby when a radiator is secured in position thereon, said radiator may be tilted to any desired position to facilitate inspection thereof and whereby a mechanic may quickly repair known leaks in the radiator, after which the support with the radiator secured thereto may be actuated to submerge the radiator in a tank of water to test it for other leaks, said tank constituting a part of the apparatus.

A further object of the invention is to provide an apparatus of the class described, comprising a pair of upright standards having a pair of axially aligned shafts supported in their upper ends, which shafts cooperate to movably support an upright cylinder having a piston rod mounted therein to the lower end of which a suitable guide head is secured, and an arch-shaped member being movably supported in said head and having means at its spaced ends for removably securing a radiator thereto, and also whereby the radiator may be rotated about a horizontal axis disposed at right angles to the axis of the cylinder, and means being provided for delivering a pressure fluid to the cylinder whereby the piston rod may be actuated to lower the radiator into a tank of water, when necessary, to test it for leaks.

Other objects of the invention reside in the unique connection between the arch-shaped member and the piston rod whereby the radiator may be rotated about a horizontal axis; in the means for supporting the radiator on the spaced arms of the arch-shaped member whereby the cylinder may be rotated about a horizontal axis disposed at substantially right angles to said first mentioned axis, and also whereby the radiator may be inverted without removing it from the apparatus; and in the provision of such an apparatus which provides a universal support for a radiator while in the process of being repaired, and whereby the radiator may be positioned in any desired position to facilitate and expedite making repairs thereto.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow. In the drawings:

Figure 1:
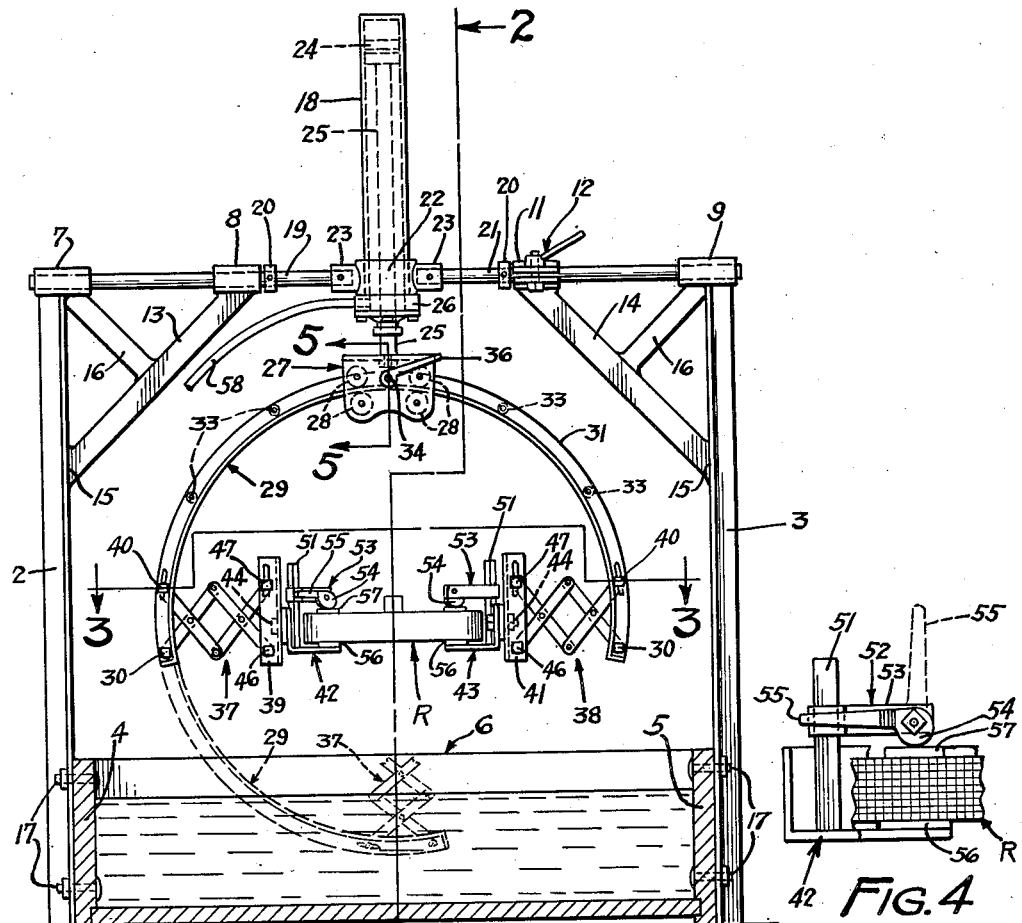
Figure 1 is a vertical sectional view substantially on the line 1—1 of Figure 2, showing a radiator supported in the apparatus directly over the water tank.
Figures 3, 4:
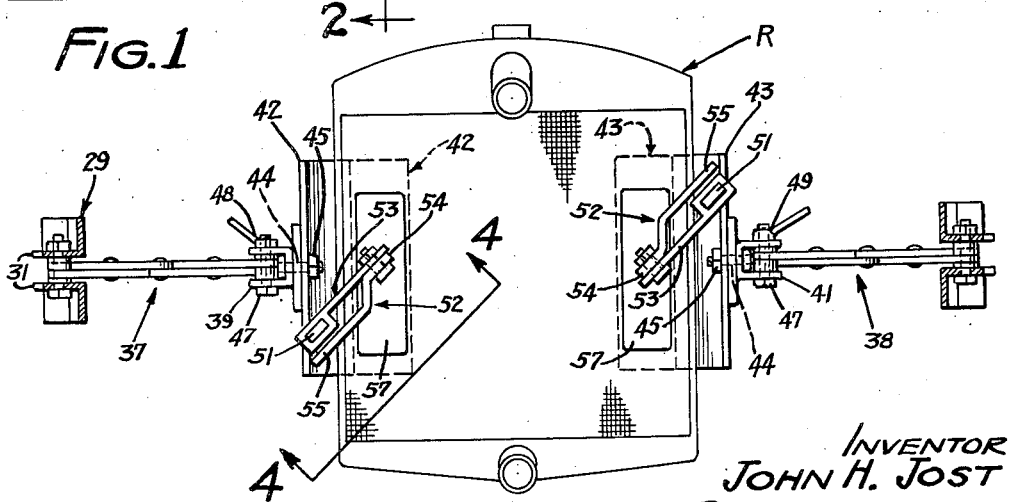
Figure 3 is a sectional plan view substantially on the line 3—3 of Figure 1, on a larger scale.
Figure 5:
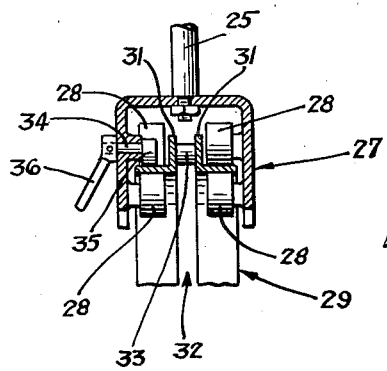

Figure 4 is an enlarged detailed view on the line 4—4 of Figure 3, showing one of the clamping elements for securing the radiator in position in the apparatus; and Figure 5 is an enlarged detail sectional view substantially on the line 5—5 of Figure 1, showing the preferred construction of the arch-shaped member and the manner of supporting it for relative movement in the guide head secured to the lower end of the piston rod.

The novel apparatus herein disclosed is shown comprising two standards or uprights 2 and 3 which, for convenience, may be secured to the opposed walls 4 and 5 of a suitable tank, generally designated by the numeral 6. The tank is adapted to contain a suitable liquid such as water into which the radiator, generally designated by the numeral R, may be submerged after repairs have been made thereto, for the purpose of checking it for leaks as is well known.

The upright 2 is shown provided at its upper end with suitable bearings 7 and 8 and the upright 3 is provided with bearings 9 and 11. The bearing 11 is preferably split, and has a clamping bolt 12 whereby said bearing may be contracted for reasons subsequently to be described. The uprights or standards 2 and 3 may be constructed of structural steel such as I-beams, and the bearings 7 and 9, respectively, may be welded to the upper ends thereof, as shown in Figure 1. The bearings 8 and 11, respectively, are shown welded to diagonal braces 13 and 14 which may have their lower ends welded to their respective standards, as indicated at 15. Suitable struts 16 are shown interposed between the diagonal braces 13 and 14 and the bearings 7 and 9, respectively, thereby to provide a very substantial structure which may be manufactured at small cost. The lower ends of the standards may be secured to the walls of the tank by suitable bolts 17. Obviously, the supporting structure above described may be constructed of any suitable material applicable for the purpose.

A suitable lifting device is supported in the bearings 7, 8, 9 and 11, and is shown comprising a cylinder 18 having opposed shafts 19 and 21 secured thereto by such means as a collar 22 which may be suitably fixed to the wall of the cylinder or, if desired, the projections 23, in which the adjacent ends of the shafts 19 and 21 are secured, may be integrally formed with the cylinder wall. The shaft 19 is shown rotatably supported in the bearings 7 and 8 of the standard 2, and the shaft 21 is similarly supported in the bearings 9 and 11 of the standard 3. It is to be understood that the shafts 19 and 21 are axially aligned with one another whereby the said shafts may freely rotate in their respective bearings to oscillate the cylinder to facilitate positioning the radiator R, as indicated by the dotted lines in Figure 2. The clamping bolt 12 serves to contract the bearing 11, thereby to secure the cylinder in adjusted position. Collars 20 may be secured to the shafts 19 and 21 to prevent endwise movement thereof.

By supporting the shafts 19 and 21 in the bearings of the uprights 2 and 3, as above described, it will readily be noted that the space between the uprights 2 and 3 may be varied to adapt the apparatus for tanks of different widths. For example, if a wider tank is to be used than the one shown in Figure 1, then it will be necessary to provide longer shafts 19 and 21. On the other hand, if the apparatus is to be used with a tank relatively narrower than the one shown in Figure 1, the collar 20 may be moved inwardly towards the cylinder 18 after which the uprights 2 and 3 could be moved inwardly to accommodate the smaller tank.

A suitable piston 24 is mounted for reciprocal movement within the cylinder 18 and has a piston rod or plunger 25 projecting through the head 26 provided at the lower end of the cylinder. A guide head 27 is secured to the lower end of the piston rod 25 and is shown provided with a plurality of anti-friction rollers 28 which are arranged in pairs, as shown in Figure 5, and cooperate to movably support an arch-shaped member 29, shown formed of opposed angle irons 31 disposed in back-to-back relation, and preferably spaced apart as shown at 32 in Figure 5, although not necessarily. The angle irons 31 of the arch-shaped member 29 are secured together by suitable means such as shouldered studs or rivets 33 whereby they become in effect, a unitary structure.

Mounted in the guide head 27 is a short shaft 34 provided at one end with an eccentric 35 adapted to engage the adjacent angle 31 of the arch-shaped member 29, as best illustrated in Figure 5. A suitable operating handle 36 is secured to the outer end of the shaft 34 whereby the eccentric 35 may be manipulated to lock the member 29 in adjusted position in the head 27.

Means is provided in the opposed ends of the arch-shaped member 29 for removably and adjustably supporting the radiator R. Such means is shown comprising a pair of lazy tongs, generally designated by the numerals 37 and 38. These lazy tongs are well known in the art and it is therefore deemed unnecessary to herein describe the same in detail. One end of each lazy tong is shown operatively connected to its respective end of the arch-shaped member 29 by suitable pivot bolts 30 and 40, as best shown in Figure 1. Upright channel members 39 and 41 are pivotally connected to the inner or opposite ends of the lazy tongs 37 and 38, respectively, by pivot bolts 46 and 47, as clearly illustrated in Figures 1 and 3.

Figure 2:
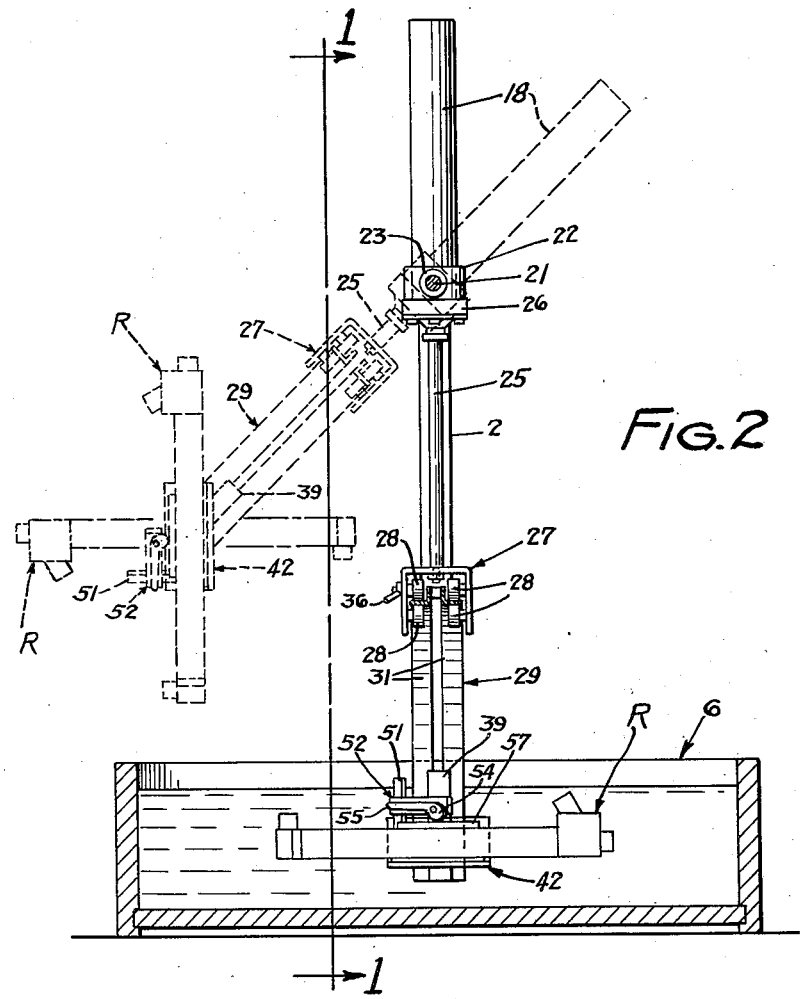
Figure 2 is a vertical sectional view substantially on the line 2—2 of Figure 1, showing in full lines the apparatus actuated to submerge a radiator into the water in the tank, the dotted lines indicating the radiator positioned at one side of the tank to facilitate inspection of the radiator or making repairs thereto.

Secured to the channel members 39 and 41 are opposed brackets 42 and 43, respectively, which are arranged to support the radiator R as shown in Figures 1, 2 and 3. The brackets 42 and 43 are adapted for rotary adjustment upon their respective channel members 39 and 41 about pivot pins 44, and may be secured in adjusted position by manipulation of suitable nuts 45 received in threaded engagement with the pivot pins 44, as shown in Figure 3. The upper pivot bolts 47 of the lazy tongs 37 and 38 are shown provided with clamping nuts 48 whereby the lazy tongs may be locked against relative movement so that the brackets 42 and 43 may be spaced apart in fixed relation, when repairing radiators of a given size.

Secured to each bracket 42 and 43, is an upright post 51 upon which are slidably mounted suitable clamping devices, generally designated by the numeral 52. Each clamping device is shown comprising a laterally extending arm 53 having a socket at one end slidably receiving its respective post 51, and whereby the arms are adapted for vertical adjustment on their respective posts 51. An eccentric 54 is rotatably mounted at the outer end of each arm 53 and each has an operating handle 55 whereby the eccentrics 54 may be conveniently manipulated to secure the radiator in position upon the brackets 42 and 43. Suitable clamping plates 56 and 57 are preferably provided for protecting the radiator when the eccentrics 54 are manipulated to secure the radiator to the brackets 42 and 43.

In the operation of the novel apparatus herein disclosed, the clamping devices 52 are detached from the upright posts 51 of the brackets 42 and 43, and the spacing between the brackets is then varied to properly position the brackets for receiving the particular radiator to be repaired. The radiator is then placed upon the inwardly projecting ledges or flanges of the brackets 42 and 43, as will be understood by reference to Figures 1 and 3, after which the clamping devices 52 are engaged with their respective posts 51 and the eccentrics 54 manipulated to secure the radiator in position upon the brackets 42 and 43. Before securing the radiator thereto, however, the clamping plates 56 and 57 are first placed in engagement with the radiator whereby the clamping forces exerted upon the radiator are distributed over relatively greater areas thereby to prevent the eccentrics from causing damage to the radiator.

After the radiator has been secured in position upon the brackets 42 and 43, the apparatus is adjusted to so position the radiator that it may be conveniently operated upon by the workman, it being understood that the apparatus provides a universal support for the radiator whereby it may be adjusted to any desired position. In Figure 2, for example, there is indicated in dotted lines two positions of the radiator. It will also be noted that in this figure the cylinder has been oscillated to outwardly swing the brackets 42 and 43 to one side of the tank 6, whereby the operator may conveniently work upon the radiator as will be understood.

The mounting of the arch-shaped member 29 in the guide head 27 of the piston rod also makes it possible to rotate the cylinder about an axis passing through the radiator and disposed at right angles to the median plane of the arch-shaped member 29. In addition, the pivot bolts 44 which secure the brackets 42 and 43 to their respective lazy tongs 37 and 38, provide means whereby the radiator may be inverted from the position shown in Figure 2, by simply rotating the brackets about the aligned axes of the bolts 44. In addition, the radiator may readily be rotated about the axis of the piston rod 25 by simply rotating the guide head 27 and piston rod 25 relative to the cylinder 18.

When the workman has completed his repair work upon the radiator, air from a suitable source may be introduced into the radiator core and the piston rod is then manipulated to lower the radiator into the water tank 6, as shown in full lines in Figure 2, whereby should the workman have overlooked or missed other leaks in the radiator, they may be quickly detected as a result of the air escaping upwardly through the water in the form of bubbles, as is well known. Before the radiator is submerged in the water in the tank 6, the usual intake and outlet openings are sealed by the insertion therein of suitable plugs or corks in the usual manner.

From the foregoing, it will be noted that once the radiator has been positioned in this novel apparatus herein disclosed, all necessary repair work may be performed thereon without removing the radiator from the brackets 42 and 43. In other words, leaks in the radiator core may be soldered and other work may be performed thereon and after such work has been completed, the radiator may be quickly submerged in the tank 6 to determine if the repaired leaks have been sealed, and if additional leaks should show up, such leaks may be quickly repaired before removing the radiator from the apparatus. Thus, it will be noted that in most cases, all repairs may be performed on a radiator with a single mounting of the radiator in the apparatus.

The apparatus is extremely simple and inexpensive whereby it may be manufactured in quantity production at low cost. The cylinder 18 may be supplied with a suitable pressure fluid through the conduit 58 which may be connected to a suitable source of fluid pressure such as air or liquid. The split bearing 11 of the standard 3 provides means for securing the cylinder 18 in any desired angular position, whereby the radiator to be repaired may be positioned at any desired angle and elevation to facilitate the operation of making repairs thereto.

The apparatus readily lends itself for use in garages and other places where it is customary to repair radiators and the like. With this novel device, the operation of repairing a radiator becomes a very simple one in that the usual manual labor required in the handling of radiators, when repairing them in the conventional way, is reduced to a minimum. With this apparatus all necessary repair work to be performed upon a radiator may usually be accomplished with a single setting of the radiator, including the operation of submerging the radiator in water to check it for leaks after is has been soldered.

While I have herein shown the apparatus as used primarily for the purpose of supporting radiators such as used in automobiles, trucks, and tractors, it is to be understood that it may be used for supporting other work where applicable. For certain classes of work, it may also be possible to dispense with the water tank 6, but when used for radiators, the tank forms an important part of the structure in that it makes it possible to complete the work to be done on a radiator with one setting thereof which heretofore has been practically impossible.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. In an apparatus for repairing automobile radiators and the like, a standard provided at its upper end with horizontally disposed bearings, a shaft mounted for rotary movement in said bearings, a lifting device secured to the shaft, said lifting device comprising a head adapted for up-and-down movement, means in said head providing a guide, an arch-shaped member movably supported in said guide and having means at its lower ends for receiving and supporting a radiator to be repaired, said shaft, lifting device, and arch-shaped member cooperating to provide a universal support for the radiator, and a water-containing tank disposed beneath said lifting device whereby when a radiator has been repaired, said lifting device may be operated to lower the radiator into the water in said tank to check the radiator for leaks, and without removing the radiator from said arch-shaped member.

2. In an apparatus for repairing automobile radiators and the like, a pair of spaced standards having aligned bearings at their upper ends, a cylinder having aligned shafts secured thereto and supported in said bearings whereby the cylinder may be rotated about the axes of said shafts, a plunger mounted for reciprocal movement in the cylinder, a head secured to the lower end of the plunger, opposed guides in said head, an arch shaped member movably supported in said guides and having means at its lower ends for adjustably supporting a radiator, a water tank beneath said member, and means for delivering a pressure fluid to the cylinder to control the up-and-down movement of the plunger.

3. In an apparatus for repairing automobile radiators and the like, a pair of spaced standards having aligned bearings at their upper ends, a cylinder having aligned shafts secured thereto and supported in said bearings whereby the cylinder is adapted for oscillating movement about the axes of said shafts, a plunger mounted for reciprocal movement in the cylinder, a head secured to the lower end of the plunger, opposed guides in said head, an arch-shaped member movably supported in said guides and having means at its lower ends for receiving and supporting a radiator and whereby the radiator may be rotated about a horizontal axis to invert the radiator, said opposed guides also permitting the radiator to be rotated about a horizontal axis disposed at right angles to said first mentioned axes, thereby to facilitate positioning the radiator for receiving repairs, a water tank positioned beneath said member, and means for conducting a suitable pressure fluid to the cylinder to control the up-and-down movement of the plunger and the arch-shaped member.

4. In an apparatus for repairing automobile radiators and the like, a pair of spaced standards having horizontally disposed spaced bearings at their upper ends, the bearing on one standard being axially aligned with the bearing on the other standard, a cylinder having a pair of shafts secured thereto in axial alignment with one another adapted to be received in the bearings of said standards, whereby the cylinders may be oscillated about the aligned axes of said shafts, a plunger mounted for reciprocal movement within the cylinder, a head secured to the lower end of the plunger and having opposed anti-friction guide elements therein, an arch-shaped member mounted for movement in said guides, cooperating means at the lower ends of said member adapted to support a radiator, and whereby the radiator may be rotated about a horizontal axis substantially intersecting the spaced ends of the arch-shaped member, a water-containing tank beneath said member, and means for delivering a pressure fluid to the cylinder whereby the plunger may be actuated to lower the radiator into the water in said tank to check it against leaks.

5. In an apparatus of the class described, a pair of standards having horizontally disposed bearings at their upper ends, a cylinder having opposed shaft extensions rotatably supported in said bearings and whereby the cylinder may be oscillated in a vertical plane, a piston in the cylinder having a piston rod projecting from its lower end, a guide head secured to the lower end of the piston, an arch-shaped member movably supported in said guide head, means on the guide head for locking the arch-shaped member in adjusted position, a pair of upright elements mounted on the lower ends of said arch-shaped member and adapted for movement towards and away from each other thereby to adapt the apparatus for supporting radiators of different sizes, a pair of opposed radiator supporting brackets rotatably mounted on said upright elements, each of said brackets having a clamping device mounted thereon for securing a radiator in fixed position upon said brackets, a tank disposed beneath the cylinder adapted to contain a supply of water, and means for delivering a pressure fluid to the cylinder to operate the piston and whereby the arch-shaped member may be vertically adjusted to any position within the range of its travel, the mounting of said cylinder, piston rod, arch-shaped member, and said brackets being such that a radiator secured in position upon said brackets may be positioned to one side of the tank and in any desired position relative thereto to facilitate making repairs thereon.

6. In an apparatus for repairing automobile radiators, a suitable standard, a lifting device suspended from the upper end thereof and comprising a guide head having a plurality of anti-friction rollers mounted therein, a semi-circular member movably supported on the anti-friction rollers in said guide head, radiator receiving brackets mounted on the lower ends of said semi-circular member and adapted for adjustment towards or away from one another to adapt the apparatus for radiators of different sizes, a locking device carried by said guide head for locking the arch-shaped member in adjusted position thereon, means for securing the radiator supporting brackets in adjusted position, clamping devices detachably supported on said brackets and cooperable with the brackets to secure a radiator in position thereon, and said lifting device, guide head, member and clamping brackets cooperating to provide a universal support for a radiator to be repaired, and whereby the radiator may be positioned in any desired position to facilitate making repairs thereto.

7. In an apparatus for repairing automobile radiators and the like, a support provided at its upper end with a horizontally disposed member, a guide head suspended from said member and rotatively adjustable thereon about a vertical axis, a lifting device for vertically translating said head, a semicircular member of angular cross section movably supported in said guide head, clamping elements adjustably secured to the ends of said semi-circular member for securing a radiator therein in position to be repaired, said clamping elements being mounted for rotary movement with respect to the semi-circular member and cooperating with the guide head to provide a universal support for a radiator positioned in the clamping elements, and the vertical movement of said head permitting a radiator supported in said supporting member to be lowered into a tank of water for inspection purposes, and also permitting the radiator to be supported in any desired position to facilitate making inspection and repairs.

8. In an apparatus for repairing automobile radiators and the like, a guide head, a support for said guide head operable to vertically translate the guide head, said support also having means for rotating said head about a vertical axis, a semi-circular member movably supported in said guide head, locking elements for securing said member against movement in the guide head, clamping elements for receiving and supporting a radiator to be repaired in said semi-circular member, said clamping elements having pivots movably securing them to the opposed end portions of said semi-circular member, whereby the clamping elements are movable towards and away from one another to adapt the apparatus for handling radiators of different sizes, and a tank into which the radiator may be submerged to inspect it for leaks.

JOHN H. JOST.

REFERENCES CITED

The following references are of record in the file of this patent:

UNITED STATES PATENTS

| Number | Name | Date |
|---|---|---|
| 563,939 | McBride et al. | July 14, 1896 |
| 1,321,310 | Jerden | Nov. 11, 1919 |
| 1,382,626 | Cantos | June 28, 1921 |
| 1,432,725 | Nolting | Oct. 17, 1922 |
| 1,460,344 | Kager | June 26, 1923 |
| 1,469,176 | Carris et al. | Sept. 25, 1923 |
| 1,778,563 | Peck | Oct. 14, 1930 |
| 2,042,380 | Berringer | May 26, 1936 |
| 2,203,688 | Little | June 11, 1940 |